【12】 United States Patent
Bujard et al.

(10) Patent No.: US 7,273,522 B2
(45) Date of Patent: Sep. 25, 2007

(54) PLANE-PARALLEL STRUCTURES OF SILICON/SILICON OXIDE

(75) Inventors: Patrice Bujard, Reinach (CH); Holger Leybach, Schopfheim (DE); Hilmar Weinert, Kaufbeuren (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 216 days.

(21) Appl. No.: 10/517,283

(22) PCT Filed: Jun. 16, 2003

(86) PCT No.: PCT/EP03/50229

§ 371 (c)(1),
(2), (4) Date: Dec. 8, 2004

(87) PCT Pub. No.: WO03/106569

PCT Pub. Date: Dec. 24, 2003

(65) Prior Publication Data

US 2005/0252410 A1  Nov. 17, 2005

(30) Foreign Application Priority Data

Jun. 18, 2002 (DE) .................. 102 27 229
Jan. 17, 2003 (EP) .................. 03405017
Mar. 6, 2003 (EP) .................. 03100548

(51) Int. Cl.
*C04B 14/04* (2006.01)
(52) U.S. Cl. ..................... 106/481; 106/482
(58) Field of Classification Search ............. 106/481, 106/482
See application file for complete search history.

(56) References Cited

U.S. PATENT DOCUMENTS

| | | | |
|---|---|---|---|
| 2,865,778 A | 12/1958 | Strassburg | 106/288 |
| 3,438,796 A | 4/1969 | Hanke | 106/291 |
| 5,766,335 A | 6/1998 | Bujard et al. | 106/404 |
| 6,395,249 B1 | 5/2002 | Kondo et al. | 423/349 |
| 6,586,098 B1 | 7/2003 | Coulter et al. | 428/403 |
| 2003/0075079 A1 | 4/2003 | Sommer | 106/442 |
| 2005/0013934 A1* | 1/2005 | Xiong et al. | 427/212 |
| 2005/0161678 A1* | 7/2005 | Weinert et al. | 257/77 |
| 2006/0042507 A1* | 3/2006 | Bujard et al. | 106/415 |

FOREIGN PATENT DOCUMENTS

| | | | |
|---|---|---|---|
| EP | 0803549 | | 10/1997 |
| WO | 00/43457 | | 7/2000 |
| WO | 02/31058 | | 4/2002 |
| WO | WO 2004/035693 | * | 4/2004 |
| WO | 04/065295 | | 8/2004 |

* cited by examiner

*Primary Examiner*—J. A. Lorengo
*Assistant Examiner*—Patricia L. Hailey
(74) *Attorney, Agent, or Firm*—Joseph C. Suhadolnik

(57) ABSTRACT

The present invention relates to plane-parallel structures of silicon/silicon oxide (silicon/silicon oxide flakes), obtainable by heating plane-parallel structures of $SiO_y$ in an oxygen-free atmosphere at a temperature above 400° C., wherein $0.70 \leq y \leq 1.8$, or plane-parallel structures of silicon/silicon oxide, obtainable by heating plane-parallel structures of $SiO_x$ in an oxygen-free atmosphere at a temperature above 400° C., wherein $0.03 \leq x \leq 0.95$, a process for their production and their use for the production of interference pigments.

18 Claims, No Drawings

PLANE-PARALLEL STRUCTURES OF SILICON/SILICON OXIDE

The present invention relates to plane-parallel structures of silicon/silicon oxide (silicon/silicon oxide flakes), obtainable by heating plane-parallel structures of $SiO_y$ in an oxygen-free atmosphere at a temperature above 400° C., wherein $0.70 \leq y \leq 1.8$, or plane-parallel structures of silicon/silicon oxide, obtainable by heating plane-parallel structures of $SiO_x$ in an oxygen-free atmosphere at a temperature above 400° C., wherein $0.03 \leq x \leq 0.95$, a process for their production and their use for the production of interference pigments.

In a first aspect the present invention relates to plane-parallel structures of silicon/silicon oxide.

The particles of the plane-parallel structures of silicon/silicon oxide generally have a length of from 1 μm to 5 mm, a width of from 1 μm to 2 mm, and a thickness of from 20 nm to 2 μm, and a ratio of length to thickness of at least 2:1, the silicon/silicon oxide particles having two substantially parallel faces, the distance between which is the shortest axis of the core.

The flakes of the present invention are not of a uniform shape. Nevertheless, for purposes of brevity, the flakes will be referred to as having a "diameter." The silicon/silicon oxide flakes have a high plane-parallelism and a defined thickness in the range of ±10%, especially ±5% of the average thickness. The silicon/silicon oxide flakes have a thickness of from 20 to 2000 nm, especially from 100 to 350 nm. It is presently preferred that the diameter of the flakes be in a preferred range of about 1-60 μm with a more preferred range of about 5-40 μm. Thus, the aspect ratio of the flakes of the present invention is in a preferred range of about 2.5 to 625 with a more preferred range of about 50 to 250.

The term "$SiO_y$ with $0.70 \leq y \leq 1.80$" means that the molar ratio of oxygen to silicon at the average value of the silicon oxide layer is from 0.70 to 1.80. The composition of the silicon oxide layer can be determined by ESCA (electron spectroscopy for chemical analysis).

The term "$SiO_x$ with $0.03 \leq x \leq 0.95$" means that the molar ratio of oxygen to silicon at the average value of the silicon oxide layer is from 0.03 to 0.95. The composition of the silicon oxide layer can be determined by ESCA (electron spectroscopy for chemical analysis).

The term "silicon/silicon oxide layer or flakes" comprises plane-parallel structures obtainable by heating plane-parallel structures of $SiO_y$ or $SiO_x$ in an oxygen-free atmosphere at a temperature above 400° C. and optionally an oxidative heat treatment.

According to the present invention the term "aluminum" comprises aluminum and alloys of aluminum. Alloys of aluminum are, for example described in G. Wassermann in Ullmanns Enzyklopädie der Industriellen Chemie, 4. Auflage, Verlag Chemie, Weinheim, Band 7, S. 281 to 292. Especially suitable are the corrosion stable aluminum alloys described on page 10 to 12 of WO00/12634, which comprise besides of aluminum silicon, magnesium, manganese, copper, zinc, nickel, vanadium, lead, antimony, tin, cadmium, bismuth, titanium, Chromium and/or iron in amounts of less than 20% by weight, preferably less than 10% by weight.

The present invention is illustrated in more detail on the basis of the "$SiO_y$ flakes", but is not limited thereto.

The silicon/silicon oxide flakes are prepared by a process comprising the steps:
a) vapour-deposition of a separating agent onto a (movable) carrier to produce a separating agent layer,
b) vapour-deposition of an $SiO_y$ layer onto the separating agent layer, wherein $0.70 \leq y \leq 1.8$, preferably wherein $0.70 \leq y \leq 0.99$ or $1.0 \leq y \leq 1.8$,
c) dissolution of the separating agent layer in a solvent,
d) separation of the $SiO_y$ from the solvent, and
e) heating the $SiO_y$ in an oxygen-free atmosphere to a temperature above 400° C.

The $SiO_y$ layer in step b) being vapour-deposited from a vaporiser containing a charge comprising a mixture of Si and $SiO_2$, SiO, or a mixture thereof, the weight ratio of Si to $SiO_2$ being preferably in the range from 0.15:1 to 0.75:1, and especially containing a stoichiometric mixture of Si and $SiO_2$ or a vaporiser containing a charge comprising silicon monoxide containing silicon in an amount up to 20% by weight. Step c) being advantageously carried out at a pressure that is higher than the pressure in steps a) and b) and lower than atmospheric pressure. The $SiO_y$ flakes obtainable by this method have a thickness in the range preferably from 20 to 2000 nm, especially from 20 to 500 nm, the ratio of the thickness to the surface area of the plane-parallel structures being preferably less than 0.01 $\mu m^{-1}$. The plane-parallel structures thereby produced are distinguished by high uniformity of thickness The $SiO_{1.00-1.8}$ layer in step b) is formed preferably from silicon monoxide vapour produced in the vaporiser by reaction of a mixture of Si and $SiO_2$ at temperatures of more than 1300° C.

The $SiO_{0.70-0.99}$ layer in step b) is formed preferably by evaporating silicon monoxide containing silicon in an amount up to 20% by weight at temperatures of more than 1300° C.

If, under industrial vacuums of a few $10^{-2}$ Pa, Si is vaporised (instead of Si/$SiO_2$ or SiO/Si) silicon oxides can be obtained which have an oxygen content of less than 0.95, that is to say $SiO_x$, wherein $0.03 \leq x \leq 0.95$, especially $0.05 \leq x \leq 0.50$, very especially $0.10 \leq x \leq 0.30$ (PCT/EP03/02196).

The vapour-deposition in steps a) and b) is carried out preferably under a vacuum of <0.5 Pa. The dissolution of the separating agent layer in step c) is carried out at a pressure in the range preferably from 1 to $5 \times 10^4$ Pa, especially from 600 to $10^4$ Pa, and more especially from $10^3$ to $5 \times 10^3$ Pa.

The separating agent vapour-deposited onto the carrier in step a) may be a lacquer (surface coating), a polymer, such as, for example, the (thermoplastic) polymers, in particular acryl- or styrene polymers or mixtures thereof, as described in U.S. Pat. No. 6,398,999, an organic substance soluble in organic solvents or water and vaporisable in vacuo, such as anthracene, anthraquinone, acetamidophenol, acetylsalicylic acid, camphoric anhydride, benzimidazole, benzene-1,2,4-tricarboxylic acid, biphenyl-2,2-dicarboxylic acid, bis(4-hydroxyphenyl)sulfone, dihydroxyanthraquinone, hydantoin, 3-hydroxybenzoic acid, 8-hydroxyquinoline-5-sulfonic acid monohydrate, 4-hydroxycoumarin, 7-hydroxycoumarin, 3-hydroxynaphthalene-2-carboxylic acid, isophthalic acid, 4,4-methylene-bis-3-hydroxynaphthalene-2-carboxylic acid, naphthalene-1,8-dicarboxylic anhydride, phthalimide and its potassium salt, phenolphthalein, phenothiazine, saccharin and its salts, tetraphenylmethane, triphenylene, triphenylmethanol or a mixture of at least two of those substances. The separating agent is preferably an inorganic salt soluble in water and vaporisable in vacuo (see, for example, DE 198 44 357), such as sodium chloride, potassium chloride, lithium chloride, sodium fluoride, potassium fluoride, lithium fluoride, calcium fluoride, sodium aluminium fluoride and disodium tetraborate.

The movable carrier may consist of one or more discs, cylinders or other rotationally symmetrical bodies, which rotate about an axis (cf. WO01/25500), and consists preferably of one or more continuous metal belts with or without a polymeric coating or of one or more polyimide or polyethylene terephthalate belts (DE19844357).

Step d) may comprise washing-out and subsequent filtration, sedimentation, centrifugation, decanting and/or evaporation. The plane-parallel structures of $SiO_y$ may, however, also be frozen together with the solvent in step d) and subsequently subjected to a process of freeze-drying, whereupon the solvent is separated off as a result of sublimation below the triple point and the dry $SiO_y$ remains behind in the form of individual plane-parallel structures.

The plane-parallel structures of $SiO_y$ separated off in step d) are then heated in an oxygen-free atmosphere such as, for example, argon and/or helium or under a vacuum of less than 13 Pa ($10^{-1}$ Torr) at a temperature of at least 400° C., especially at above 400° C., preferably in the form of loose material, in a fluidised bed, preferably at a temperature in the range from 900 to 1100° C., to form the silicon/silicon oxide flakes.

The invention relates also to plane-parallel structures of silicon/silicon oxide that are obtainable by this method and have a thickness preferably in the range from 20 to 2000 nm, especially 20 to 500 nm.

Except under an ultra-high vacuum, in technical vacuums of a few $10^{-2}$ Pa vaporised SiO always condenses as $SiO_y$, wherein $1 \leq y \leq 1.8$, especially wherein $1.1 < y < 1.8$, because high-vacuum apparatuses always contain, as a result of gas emission from surfaces, traces of water vapour which react with the readily reactive SiO at vaporisation temperature.

On its further course, the belt-form carrier, which is closed to form a loop, runs through dynamic vacuum lock chambers of known mode of construction (cf. U.S. Pat. No. 6,270,840) into a region of from 1 to $5 \times 10^4$ Pa pressure, preferably from 600 to $10^4$ Pa pressure, and especially from $10^3$ to $5 \times 10^3$ Pa pressure, where it is immersed in a dissolution bath. The temperature of the solvent should be so selected that its vapour pressure is in the indicated pressure range. With mechanical assistance, the separating agent layer rapidly dissolves and the product layer breaks up into flakes, which are then present in the solvent in the form of a suspension. On its further course, the belt is dried and freed from any contaminants still adhering to it. It runs through a second group of dynamic vacuum lock chambers back into the vaporisation chamber, where the process of coating with separating agent and product layer of SiO is repeated.

The suspension then present in both cases, comprising product structures and solvent, and the separating agent dissolved therein, is then separated in a further operation in accordance with a known technique. For that purpose, the product structures are first concentrated in the liquid and rinsed several times with fresh solvent in order to wash out the dissolved separating agent The product, in the form of a solid that is still wet, is then separated off by filtration, sedimentation, centrifugation, decanting or evaporation.

The product can then be brought to the desired particle size by means of grinding or air-sieving and delivered for further use.

In the production of the silicon/silicon oxide flakes, variants are possible:

It is possible to arrange several separating agent and product vaporisers one after the other in the running direction of the belt in the vaporisation zone. By that means there is obtained, with little additional outlay in terms of apparatus, a layer sequence of S+P+S+P, wherein S is the separating agent layer and P is the product layer. If the number of vaporisers is doubled and the belt speed is the same, twice the amount of product is obtained.

Separating off the plane-parallel structures after washing-out at atmospheric pressure can be carried out under gentle conditions by freezing the suspension, which has been concentrated to a solids content of about 50%, and subjecting it in known manner to freeze-drying at about −10° C. and 50 Pa pressure. The dry substance remains behind as product, which can be subjected to the steps of further processing by means of coating or chemical conversion.

Instead of using a continuous belt, it is possible to produce the product by carrying out the steps of vapour-deposition of separating agent and SiO, of dissolution, and of drying the carrier, in an apparatus having a rotary body, in accordance with WO01/25500. The rotary body may be one or more discs, a cylinder or any other rotationally symmetrical body.

It should be noted that the silicon/silicon oxide flakes themselves show no colors when embedded in a transparent resin, which has an index of refraction ranging from 1.4 to 1.55. In such a case the embedded semi-transparent flakes act as UV absorber.

It is assumed that by heating $SiO_y$ particles (or $SiO_x$ particles) in an oxygen-free atmosphere, i.e. an argon or helium atmosphere or in a vacuum of less than 13 Pa ($10^{-1}$ Torr), at a temperature above 400° C., especially 400 to 1100° C., $SiO_y$ disproportionates in $SiO_2$ and Si.

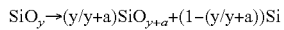

$$SiO_y \rightarrow (y/y+a)SiO_{y+a} + (1-(y/y+a))Si$$

In this disproportion $SiO_{y+a}$ flakes are formed, containing $(1-(y/y+a))$ Si, wherein $0.70 \leq y \leq 1.8$, especially $0.70 \leq y \leq 0.99$ or $1 \leq y \leq 1.8$, $0.05 \leq a \leq 1.30$, and the sum y and a is equal or less than 2. $SiO_{y+a}$ is an oxygen enriched silicon suboxide. The complete conversion of $SiO_y$ in Si and $SiO_2$ is preferred:

$$SiO_y \rightarrow (y/2)SiO_2 + (1-(y/2))Si$$

In the temperature range of from 400 to 900° C. the formed silicon is amorph. In the temperature range of from 900 to 1100° C. silicon crystallites are formed. The average crystallite size is in the range of from 1 to 20 nm, especially 2 to 10 nm. The size is on the one hand dependent on the temperature. That is, at 1100° C. larger crystallites than at 900° C. are formed. On the other hand a clear tendency for the formation of smaller crystallites is found, the higher the oxygen level of the $SiO_y$ is. Depending on the preparation the Si containing, plane-parallel $SiO_{y+a}$ particles, especially $SiO_2$ particles can show photoluminescence. For example, plane-parallel structures of $SiO_{0.86}$ (see example 2), which have been heated in vacuo at 900° C. for at least 1 hour, show photoluminescence at a wavelength greater than 800 nm, especially greater than 840 nm (excitation wavelength: ~300 nm).

Before the silicon/silicon oxide flakes are processed to interference pigments, they can be subjected to oxidative heat treatment. Known methods are available for that purpose. Air or some other oxygen-containing gas is passed through the silicon/silicon oxide flakes, which are in the form of loose material or in a fluidised bed, at a temperature of more than 200° C., preferably more than 400° C. and especially from 500 to 1000° C. for several hours.

In order to achieve orientation of the plane-parallel structures of silicon/silicon oxide approximately parallel to the surface of the surface coating layer(s), the surface tension of the structures can be modified by adding known chemicals to the surface coating, for example by means of commercially available silane oligomers. Such oligomers, known under the trade names DYNASILAN™, HYDROSIL™, PROTECTOSIL™ can also be deposited directly onto the surface of the plane-parallel structures, either from a liquid phase or by condensation, before the latter are introduced into the surface coating.

In contrast to silicon oxide flakes, which are white to slightly yellowish, $SiO_y$ flakes, which have been heated at 900° C. under a vacuum of less than $10^{-1}$ Torr for about one hour (silicon/silicon oxide flakes), become colored in air and are semi-transparent. The observed color depends on the thickness of the flakes and changes in dependence of the observation angle. For particular applications such as cosmetics the silicon/silicon oxide flakes can be used as such, whereas for paint applications the silicon/silicon oxide flakes have to be provided with further layers, such as, for example, one or more metal oxide and/or metal layers, wherein in case of the metal oxide a metal oxide layer having a high index of refraction is advantageously deposited first. It being possible, where appropriate, for the metal oxides to be reduced (DE-A-19502231, WO97/39065, DE-A-19843014 and WO00/17277).

Accordingly, the present invention also relates to plane-parallel pigments, comprising a silicon/silicon oxide layer obtainable by heating a $SiO_y$ layer in an oxygen-free atmosphere at a temperature above 400° C., wherein $0.70 \leq y \leq 1.8$, especially plane-parallel pigments, comprising (a) a silicon/silicon oxide substrate layer obtainable by heating a $SiO_y$ layer in an oxygen-free atmosphere at a temperature above 400° C., wherein $0.70 \leq y \leq 1.8$,
(b) a metal oxide of high index of refraction and
(c) optionally on top of the metal oxide of high index of refraction a metal oxide of low index of refraction; or to plane-parallel pigments, comprising a silicon/silicon oxide layer, obtainable by heating plane-parallel structures of $SiO_x$ in an oxygen-free atmosphere at a temperature above 400° C., wherein $0.03 \leq x \leq 0.95$, especially $0.05 \leq x \leq 0.50$, very especially $0.10 \leq x \leq 0.30$, or to plane-parallel pigments, comprising (a) a silicon/silicon oxide substrate layer obtainable by heating a $SiO_y$ layer in an oxygen-free atmosphere at a temperature above 400° C., wherein $0.70 \leq y \leq 1.8$,
a semi-transparent metal layer.

Various coating processes can be utilized in forming coating layers. Suitable methods for forming the coating layer include vacuum vapor deposition, sol-gel hydrolysis, CVD in a fluidized bed (U.S. Pat. No. 5,364,467 and U.S. Pat. No. 5,763,086), and electrochemical deposition. Another depositing method is the plasma enhanced chemical vapor deposition (PECVD) where the chemical species are activated by a plasma. Such a method is disclosed in detail in WO02/31058.

In principle, the plane parallel pigments can comprise in addition to the silicon/silicon oxide layer materials having a "low" index of refraction, which is defined herein as an index of refraction of about 1.65 or less, or can have a "high" index of refraction, which is defined herein as an index of refraction of greater than about 1.65. Various (dielectric) materials that can be utilized include inorganic materials such as metal oxides, metal fluorides, metal sulfides, metal nitrides, metal carbides, combinations thereof, and the like, as well as organic dielectric materials. These materials are readily available and easily applied by physical or chemical vapor deposition processes.

Nonlimiting examples of suitable low index dielectric materials that can be used include silicon dioxide ($SiO_2$), aluminum oxide ($Al_2O_3$), and metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride ($LiF$), combinations thereof, or any other low index material having an index of refraction of about 1.65 or less. For example, organic monomers and polymers can be utilized as low index materials, including dienes or alkenes such as acrylates (e.g., methacrylate), polymers of perfluoroalkenes, polytetrafluoroethylene (TEFLON), polymers of fluorinated ethylene propylene (FEP), parylene, p-xylene, combinations thereof, and the like. Additionally, the foregoing materials include evaporated, condensed and cross-linked transparent acrylate layers, which may be deposited by methods described in U.S. Pat. No. 5,877,895, the disclosure of which is incorporated herein by reference. Nonlimiting examples of suitable high index dielectric materials are given below.

Suitable metals for the semi-transparent metal layer are, for example, Cr, Ti, Mo, W, Al, Cu, Ag, Au, or Ni. Preferred pigments have the following layer structure: silicon/silicon oxide+metal+$SiO_2$+metal oxide having a high index of refraction.

In an especially preferred embodiment, the pigment on the basis of the silicon/silicon oxide substrate, obtainable by heating a $SiO_y$ layer in an oxygen-free atmosphere at a temperature above 400° C., wherein $0.70 \leq y \leq 1.8$, comprises a further layer of a dielectric material having a "high" refractive index, that is to say a refractive index greater than about 1.65, preferably greater than about 2.0, most preferred greater than about 2.2, which is applied to the entire surface of the silicon/silicon oxide substrate. Examples of such a dielectric material are zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), chromium oxide ($Cr_2O_3$), cerium oxide ($CeO_2$), yttrium oxide ($y_2O_3$), europium oxide ($EU_2O_3$), iron oxides such as iron(II)/iron(III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) or combinations thereof. The dielectric material is preferably a metal oxide, it being possible for the metal oxide to be a single oxide or a mixture of oxides, with or without absorbing properties, for example $TiO_2$, $ZrO_2$, $Fe_2O_3$, $Fe_3O_4$, $Cr_2O_3$ or ZnO, with $TiO_2$ being especially preferred.

In this embodiment the thickness of the silicon/silicon oxide substrate is generally from 20 to 1000 nm, preferably from 50 to 500 nm, and that of the $TiO_2$ layer generally from 1 to 100 nm, preferably from 5 to 50 nm.

It is possible to obtain pigments that are more intense in colour and more transparent by applying, on top of the $TiO_2$ layer, a metal oxide of low refractive index, such as $SiO_2$, $Al_2O_3$, AlOOH, $B_2O_3$ or a mixture thereof, preferably $SiO_2$, and applying a further $TiO_2$ layer on top of the latter layer (EP-A-892832, EP-A-753545, WO93/08237, WO98/53011, WO9812266, WO9838254, WO99/20695, WO00/42111, and EP-A-1213330).

Additional coatings may be applied in a manner known per se for the purpose of stabilisation with respect to weather and light.

Pigments on the basis of silicon/silicon oxide substrates, comprising a metal oxide of high index of refraction and optionally on top of the metal oxide of high index of refraction a metal oxide of low index of refraction, or a semi-transparent metal layer are preferred.

Pigments on the basis of silicon/silicon oxide substrates, which have been coated by a wet chemical method, in the indicated order are particularly preferred: $TiO_2$ (substrate: silicon/silicon oxide; layer: $TiO_2$), $(SnO_2)TiO_2$, $Fe_2O_3$, $Fe_2O_3.TiO_2$ (substrate: silicon/silicon oxide; mixed layer of $Fe_2O_3$ and $TiO_2$), $TiO_2/Fe_2O_3$ (substrate: silicon/silicon oxide; first layer: $TiO_2$; second layer: $Fe_2O_3$), $TiO_2$/Berlin blau, $TiO_2/Cr_2O_3$, $TiO_2/FeTiO_3$, $TiO_2/SiO_2/TiO_2$, $(SnO_2)$ $TiO_2/SiO_2/TiO_2$, $TiO_2/SiO_2/TiO_2/SiO_2/TiO_2$ or $TiO_2/SiO_2/Fe_2O_3$.

The metal oxide layers can be applied by CVD (chemical vapour deposition) or by wet chemical coating. The metal oxide layers can be obtained by decomposition of metal carbonyls in the presence of water vapour (relatively low molecular weight metal oxides such as magnetite) or in the presence of oxygen and, where appropriate, water vapour (e.g. nickel oxide and cobalt oxide). The metal oxide layers are especially applied by means of oxidative gaseous phase decomposition of metal carbonyls (e.g. iron pentacarbonyl, chromium hexacarbonyl; EP-A45 851), by means of hydrolytic gaseous phase decomposition of metal alcoholates (e.g. titanium and zirconium tetra-n- and -iso-propanolate; DE-A-41 40 900) or of metal halides (e.g. titanium tetrachloride; EP-A-338 428), by means of oxidative decomposition of organyl tin compounds (especially alkyl tin compounds such as tetrabutyltin and tetramethyltin; DE-A-44 03 678) or by means of the gaseous phase hydrolysis of organyl silicon compounds (especially di-tert-butoxyacetoxysilane) described in EP-A-668 329, it being possible for the coating operation to be carried out in a fluidised-bed reactor (EP-A-045 851 and EP-A-106 235). $Al_2O_3$ layers (B) can advantageously be obtained by controlled oxidation during the cooling of aluminium-coated pigments, which is otherwise carried out under inert gas (DE-A-195 16 181).

Phosphate-, chromate- and/or vanadate-containing and also phosphate- and $SiO_2$-containing metal oxide layers can be applied in accordance with the passivation methods described in DE-A-42 36 332 and in EP-A-678 561 by means of hydrolytic or oxidative gaseous phase decomposition of oxide-halides of the metals (e.g. $CrO_2Cl_2$, $VOCl_3$), especially of phosphorus oxyhalides (e.g. $POCl_3$), phosphoric and phosphorous acid esters (e.g. di- and tri-methyl and di- and tri-ethyl phosphite) and of amino-group-containing organyl silicon compounds (e.g. 3-aminopropyl-triethoxy- and -trimethoxy-silane).

Layers of oxides of the metals zirconium, titanium, iron and zinc, oxide hydrates of those metals, iron titanates, titanium suboxides or mixtures thereof are preferably applied by precipitation by a wet chemical method, it being possible, where appropriate, for the metal oxides to be reduced. In the case of the wet chemical coating, the wet chemical coating methods developed for the production of pearlescent pigments may be used; these are described, for example, in DE-A-14 67 468, DE-A-19 59 988, DE-A-20 09 566, DE-A-22 14 545, DE-A-22 15 191, DE-A-22 44 298, DE-A-23 13 331, DE-A-25 22 572, DE-A-31 37 808, DE-A-31 37 809, DE-A-31 51 343, DE-A-31 51 354, DE-A-31 51 355, DE-A-32 11 602 and DE-A-32 35 017, DE 195 99 88, WO 93/08237, and WO 98/53001.

For the purpose of coating, the substrate particles are suspended in water and one or more hydrolysable metal salts are added at a pH suitable for the hydrolysis, which is so selected that the metal oxides or metal oxide hydrates are precipitated directly onto the particles without subsidiary precipitation occurring. The pH is usually kept constant by simultaneously metering in a base. The pigments are then separated off, washed, dried and, where appropriate, baked, it being possible to optimise the baking temperature with respect to the coating in question. If desired, after individual coatings have been applied, the pigments can be separated off, dried and, where appropriate, baked, and then again re-suspended for the purpose of precipitating further layers.

The metal oxide layers are obtainable, for example, in analogy to a method described in DE-A-195 01 307, by producing the metal oxide layer by controlled hydrolysis of one or more metal acid esters, where appropriate in the presence of an organic solvent and a basic catalyst, by means of a sol-gel process. Suitable basic catalysts are, for example, amines, such as triethylamine, ethylenediamine, tributylamine, dimethylethanolamine and methoxy-propylamine. The organic solvent is a water-miscible organic solvent such as a $C_{1-4}$ alcohol, especially isopropanol.

Suitable metal acid esters are selected from alkyl and aryl alcoholates, carboxylates, and carboxyl-radical- or alkyl-radical- or aryl-radical-substituted alkyl alcoholates or carboxylates of vanadium, titanium, zirconium, silicon, aluminium and boron. The use of triisopropyl aluminate, tetraisopropyl titanate, tetraisopropyl zirconate, tetraethyl orthosilicate and triethyl borate is preferred. In addition, acetylacetonates and acetoacetylacetonates of the aforementioned metals may be used. Preferred examples of that type of metal acid ester are zirconium acetylacetonate, aluminium acetylacetonate, titanium acetylacetonate and diisobutyloleyl acetoacetylaluminate or diisopropyloleyl acetoacetylacetonate and mixtures of metal acid esters, for example Dynasil® (Hüls), a mixed aluminium/silicon metal acid ester.

As a metal oxide having a high refractive index, titanium dioxide is preferably used, the method described in U.S. Pat. No. 3,553,001 being used, in accordance with an embodiment of the present invention, for application of the titanium dioxide layers.

An aqueous titanium salt solution is slowly added to a suspension of the material being coated, which suspension has been heated to about 50-100° C., especially 70-80° C., and a substantially constant pH value of about from 0.5 to 5, especially about from 1.2 to 2.5, is maintained by simultaneously metering in a base such as, for example, aqueous ammonia solution or aqueous alkali metal hydroxide solution. As soon as the desired layer thickness of precipitated $TiO_2$ has been achieved, the addition of titanium salt solution and base is stopped.

This method, also referred to as a titration method, is distinguished by the fact that an excess of titanium salt is avoided. That is achieved by feeding in for hydrolysis, per unit time, only that amount which is necessary for even coating with the hydrated $TiO_2$ and which can be taken up per unit time by the available surface of the particles being coated. In principle, the anatase form of $TiO_2$ forms on the surface of the starting pigment By adding small amounts of $SnO_2$, however, it is possible to force the rutile structure to be formed. For example, as described in WO 93/08237, tin dioxide can be deposited before titanium dioxide precipitation and the product coated with titanium dioxide can be calcined at from 800 to 900° C.

Where appropriate, an $SiO_2$ protective layer can be applied on top of the titanium dioxide layer, for which the following method may be used: A soda waterglass solution is metered in to a suspension of the material being coated, which suspension has been heated to about 50-100° C., especially 70-80° C. The pH is maintained at from 4 to 10, preferably from 6.5 to 8.5, by simultaneously adding 10% hydrochloric acid. After addition of the waterglass solution, stirring is carried out for 30 minutes.

It is possible to obtain pigments that are more intense in colour and more transparent by applying, on top of the $TiO_2$ layer, a metal oxide of "low" refractive index, that is to say a refractive index smaller than about 1.65, such as $SiO_2$, $Al_2O_3$, AlOOH, $B_2O_3$ or a mixture thereof, preferably $SiO_2$, and applying a further $Fe_2O_3$ and/or $TiO_2$ layer on top of the latter layer. Such multi-coated interference pigments comprising a silicon/silicon oxide substrate and alternating metal oxide layers of with high and low refractive index can be prepared in analogy to the processes described in WO98/53011 and WO99/20695.

It is, in addition, possible to modify the powder colour of the pigment by applying further layers such as, for example, coloured metal oxides or Berlin Blue, compounds of transition metals, e.g. Fe, Cu, Ni, Co, Cr, or organic compounds such as dyes or colour lakes.

It is furthermore possible to subject the finished pigment to subsequent coating or subsequent treatment which further increases the light, weather and chemical stability or which facilitates handling of the pigment, especially its incorporation into various media. For example, the procedures described in DE-A-22 15 191, DE-A-31 51 354, DE-A-32 35 017 or DE-A-33 34 598 are suitable as subsequent treatment or subsequent coating.

In addition, the pigment according to the invention can also be coated with poorly soluble, firmly adhering, inorganic or organic colourants. Preference is given to the use of colour lakes and, especially, aluminium colour lakes. For that purpose an aluminium hydroxide layer is precipitated, which is, in a second step, laked by using a colour lake (DE-A-24 29 762 and DE 29 28 287).

Furthermore, the pigment according to the invention may also have an additional coating with complex salt pigments, especially cyanoferrate complexes (EP-A-141 173 and DE-A-23 13 332).

In a further preferred embodiment, the pigment comprises in this order:

(a1) a silicon/silicon oxide layer obtainable by heating a $SiO_x$ layer, especially a $SiO_y$ layer in an oxygen-free atmosphere at a temperature above 400° C., (b1) a reflective layer, especially a metal layer, and (c1) a silicon/silicon oxide layer obtainable by heating a $SiO_x$ layer, especially a $SiO_y$ layer in an oxygen-free atmosphere at a temperature above 400° C., wherein $0.70 \leq y \leq 1.8$ and optionally further layers.

The pigments obtainable by heating SiO/reflective material/$SiO_y$ particles and comprising layers (a1), (b1) and (c1) are prepared by a process comprising the steps:

a) vapour-deposition of a separating agent onto a movable carrier to produce a separating agent layer, b1) vapour-deposition of an $SiO_y$ layer onto the separating agent layer, wherein $0.70 \leq y \leq 1.8$, preferably wherein $0.70 \leq y \leq 0.99$ or $1.0 \leq y \leq 1.8$, especially wherein $1.1 \leq y \leq 1.8$, b2) vapour-deposition of a reflective material, especially aluminium, onto the layer obtained in step (b1), b3) vapour-deposition of an $SiO_y$ layer onto the metal layer, c) dissolution of the separating agent layer in a solvent, d) separation of the SiO/reflective material/$SiO_y$ particles from the solvent, and e) heating the $SiO_y$/reflective material/$SiO_y$ particles in an oxygen-free atmosphere to a temperature above 400° C.

If step (b3) is omitted, unsymmetrical pigments comprising layers (a1) and (b1) are obtained.

In a preferred embodiment, the above pigment comprises a further layer of a dielectric material having a "high" refractive index, that is to say a refractive index greater than about 1.65, which is applied to the entire surface of the (silicon/silicon oxide)/reflective material/(silicon/silicon oxide) substrate (see above). The dielectric material is preferably a metal oxide, it being possible for the metal oxide to be a single oxide or a mixture of oxides, with or without absorbing properties, for example $CeO_2$, $TiO_2$, $ZrO_2$, $Fe_2O_3$, $Fe_3O_4$, $Cr_2O_3$ or ZnO, with $CeO_2$, $TiO_2$, and $ZrO_2$ being especially preferred.

The reflective layer consists preferably of a metallic reflecting material, especially Ag, Al, Au, Cu, Cr, Ge, Mo, Ni, Si, Ti, the alloys thereof, graphite, $Fe_2O_3$ or $MoS_2$, particularly preferably Al or $MoS_2$. If Al forms the reflective layer and the reflective layer should be retained, temperatures above 600° C. should be avoided to prevent reaction of the Al with silicon and/or silicon oxide contained in the neighbouring layers. If Al forms the reflective layer and the flakes are heated to temperatures above 600° C., the Al reacts with silicon and/or silicon oxide contained in the neighbouring layers and the reflective layer is converted into a transparent aluminum silicate layer.

If Al is used as metal of layer (b1), the thickness of layer (b1) is generally 20 to 100 nm, especially 40 to 60 nm. The Al is evaporated at temperatures of more than 1000° C.

The thickness of layers (a1) and (c1) is generally 2 to 500 nm, especially 50 to 300 nm.

In addition, after heat-treatment in an oxygen-free atmosphere, the flakes can be subjected to oxidative heat treatment in air or some other oxygen-containing gas at a temperature of more than 200° C., preferably more than 400° C. and especially from 500 to 1000° C.

It is furthermore possible to convert plane-parallel structures of silicon/silicon oxide, starting from their surface, partially to silicon carbide (SiC) (in the context of the present Application, this procedure shall be referred to as "carburisation"; see PCT/EP03/01323). This processing step results in modified chemical and mechanical properties.

After partial conversion to SiC, the surface of the plane-parallel structures is distinguished, in comparison to silicon oxide, by greater hardness, reduced electrical insulation properties and reflection in the infra-red of up to 80% as opposed to reflection of 8% in the case of $SiO_2$ structures. In accordance with the invention, the conversion is carried out on all sides, that is to say even at the side edges of the structures. Such a conversion makes use of the fact that silicon oxide reacts at elevated temperature in the presence of carbon-containing gases to form SiC. The plane-parallel structures obtained by such means are novel and the present invention relates also thereto.

Consequently, the present invention relates also to plane-parallel structures (pigments) based on plane-parallel silicon/silicon oxide substrates having on their surface a layer comprising silicon carbide (SiC). The $SiO_y$-to-SiC reaction takes place starting from the surface of the plane-parallel structures and accordingly results in a gradient rather than a sharp transition. This means that, in that embodiment, the SiC-containing layer consists of (silicon/silicon oxide)$_a$ and (SiC)$_b$, wherein $0 \leq a < 1$ and $0 < b \leq 1$, with b being 1 and a being 0 close to the surface of the pigment and the amount of SiC approaching 0 close to the boundary with the silicon/silicon oxide substrate.

For that purpose, the $SiO_y$ flakes, after they have been heated in an oxygen-free atmosphere, preferably Argon, at a temperature above 400° C., especially above 900° C., are caused to react in a gas-tight reactor heatable to a maximum of about 1500° C., preferably in the form of loose material, with a carbon-containing gas selected from alkynes, for example acetylene, alkanes, for example methane, alkenes, aromatic compounds or the like, and mixtures thereof optionally in admixture with an oxygen containing compound, such as, for example, aldehydes, ketones, water, carbon monoxide, carbon dioxide or the like, or mixtures thereof, at from 500 to 1500° C., preferably from 500 to 1000° C., and advantageously with the exclusion of oxygen. In order to temper the reaction, an inert gas, for example argon or helium, may be admixed with the carbon-containing gas.

At temperatures of less than about 500° C., that reaction generally proceeds too slowly whereas temperatures of more than about 1500° C. necessitate expensive lining of the reaction vessel with inert materials such as SiC, carbon, graphite or composite materials thereof. At pressures of less than about 1 Pa the reaction generally also proceeds too slowly whereas, especially when the carbon-containing gases are less reactive or are highly diluted with inert gas, it is perfectly possible to operate at pressures of up to about 4000 bar, as are routinely used, for example, in HIP ("hot isostatic pressing") systems.

In such carburisation, it is possible for all of the $SiO_y$ to be reacted to form SiC; preferably from 5 to 90% by weight of the $SiO_y$ are reacted to form SiC.

After carbide formation has been terminated, it is possible, optionally, for residual silicon oxide still present in the plane-parallel structures to be converted into $SiO_2$ by oxidation with an oxygen-containing gas, without destroying the SiC formed. Because of the large specific surface area of the plane-parallel structures, temperatures of about 400° C. should not, in this case, be exceeded in the presence of oxygen. The thickness of the structures produced in accordance with the invention is from 20 to 2000 nm, preferably, from 20 to 500 nm for most applications. Complete conversion of SiC into $SiO_2$ would be the consequence if an excessively high oxidation temperature were to be used.

The present invention relates furthermore to novel (plane-parallel) pigments based on $SiO_z$ substrates in platelet form having, on the surface of the $SiO_z$ substrates, wherein $0.95 \leq z \leq 2$, a layer comprising silicon carbide (SiC). The pigments are highly shear-stable and, in plastics, surface coatings or printing inks, result in high degrees of saturation and excellent fastness properties and also, in the case of interference pigments, a high degree of goniochromicity.

The pigment particles generally have a length of from 1 µm to 5 mm, a width of from 1 µm to 2 mm, and a thickness of from 20 nm to 1.5 µm, and a ratio of length to thickness of at least 2:1, the particles having a core of $SiO_z$ having two substantially parallel faces, the distance between which is the shortest axis of the core, and having an SiC-containing layer applied to the entire surface of the core and, optionally, further layers. In a preferred embodiment, the pigment comprises a further layer of a dielectric material having a "high" refractive index, that is to say a refractive index greater than about 1.65, which is applied to the entire surface of the SiC/silicon/silicon oxide substrate (see above). The dielectric material is preferably a metal oxide, it being possible for the metal oxide to be a single oxide or a mixture of oxides, with or without absorbing properties, for example $CeO_2$, $TiO_2$, $ZrO_2$, $Fe_2O_3$, $Fe_3O_4$, $Cr_2O_3$ or ZnO, with $CeO_2$, $TiO_2$, and $ZrO_2$ being especially preferred.

In this embodiment the thickness of the SiC/(silicon/silicon oxide) flakes is generally from 20 to 1000 nm, preferably from 20 to 500 nm, and that of the $TiO_2$ layer generally from 1 to 100 nm, preferably from 5 to 50 nm.

Instead of a layer of a metal oxide having a high index of refraction U.S. Pat. No. 6,524,381 materials, such as diamond-like carbon and amorphous carbon, can be deposited by plasma-assisted vacuum methods (using vibrating conveyors, rotating drum coaters, oscillatory drum coaters, and free-fall chambers) as described, for example in U.S. Pat. No. 6,524,381, on the silicon/silicon oxide substrates.

Consequently, the present invention also relates to plane-parallel structures (pigments) based on plane-parallel silicon/silicon oxide substrates having on their surface a carbon layer especially a diamond-like carbon layer having a thickness of 10 to 150 nm.

In the method described, for example, in U.S. Pat. No. 6,015,597, diamond-like network (DLN) coatings are deposited onto particles from carbon-containing gases, such as, for example, acetylene, methane, butadiene and mixtures of these and optionally Ar, and optionally gases containing additional components by plasma deposition. Deposition occurs at reduced pressures (relative to atmospheric pressure) and in a controlled environment. A carbon rich plasma is created in a reaction chamber by applying an electric field to a carbon-containing gas. Particles to be coated are held in a vessel or container in the reactor and are agitated while in proximity to the plasma. Species within the plasma react on the particle surface to form covalent bonds, resulting in DLN on the surface of the particles.

The term "diamond-like network" (DLN) refers to amorphous films or coatings comprised of carbon and optionally comprising one or more additional components selected from the group consisting of hydrogen, nitrogen, oxygen, fluorine, silicon, sulfur, titanium, and copper. The diamond-like networks comprise approximately 30 to 100 atomic percent carbon, with optional additional components making up the remainder.

In a further preferred embodiment, the pigment comprises in this order:

(a2) a silicon/silicon oxide layer obtainable by heating a $SiO_{0.70-0.99}$ layer in an oxygen-free atmosphere at a temperature above 400° C., (b2) a silicon/silicon oxide layer obtainable by heating a $SiO_{1.00-1.8}$ layer in an oxygen-free atmosphere at a temperature above 400° C., and (c2) a silicon/silicon oxide layer obtainable by heating a $SiO_{0.07-0.99}$ layer in an oxygen-free atmosphere at a temperature above 400° C. and optionally further layers.

The pigments comprising layers (a2), (b2) and (c2) are prepared by a process comprising the steps:

a) vapour-deposition of a separating agent onto a movable carrier to produce a separating agent layer, b1) vapour-deposition of a $SiO_y$ layer onto the separating agent layer, wherein $0.70 \leq y \leq 0.99$, b2) vapour-deposition of a $SiO_y$ layer, wherein $1.0 \leq y \leq 1.8$ onto the layer obtained in step (b1), b3) vapour-deposition of a $SiO_y$ layer onto the layer obtained in step (b2), c) dissolution of the separating agent layer in a solvent, d) separation of the $SiO_y/SiO_y$ particles from the solvent, and e) heating the $SiO_{0.70-0.99}/SiO_{1.0-1.8}/SiO_{0.70-0.99}$ particles in an oxygen-free atmosphere to a temperature above 400° C.

If step (b3) is omitted, unsymmetrical pigments comprising layers (a2) and (b2) are obtained.

The $SiO_{1.00-1.8}$ layer in step b) is formed preferably from silicon monoxide vapour produced in the vaporiser by reaction of a mixture of Si and $SiO_2$ at temperatures of more than 1300° C.

The $SiO_{70.0-0.99}$ layer in step b) is formed preferably by evaporating silicon monoxide containing silicon in an amount up to 20% by weight at temperatures of more than 1300° C.

It is possible, for example, for the weathering resistance to be increased by means of an additional protective layer, from 2 to 250 nm thick (preferably from 10 to 100 nm thick), of an inorganic dielectric having a refractive index $\leq 1.6$ (such as $SiO_2$, $SiO(OH)_2$ etc.).

In a preferred embodiment, the pigment comprises a further layer of a dielectric material having a "high" refractive index, that is to say a refractive index greater than about 1.65, which is applied to the entire surface of the above pigment (see above). The dielectric material is preferably a metal oxide, it being possible for the metal oxide to be a single oxide or a mixture of oxides, with or without absorbing properties, for example $CeO_2$, $TiO_2$, $ZrO_2$, $Fe_2O_3$, $Fe_3O_4$, $Cr_2O_3$ or $ZnO$, with $CeO_2$, $TiO_2$, and $ZrO_2$ being especially preferred.

The thickness of layer (b2) is generally 50 to 400 nm, especially 50 to 300 nm.

The thickness of layers (a2) and (c2) is generally 50 to 200 nm, especially 50 to 100 nm.

In addition, after heat-treatment in an oxygen-free atmosphere, the flakes can be subjected to oxidative heat treatment in air or some other oxygen-containing gas at a temperature of more than 200° C., preferably more than 400° C. and especially from 500 to 1000° C.

It is furthermore possible to convert plane-parallel structures of silicon/silicon oxide as described above, starting from their surface, partially to silicon carbide (SiC) (in the context of the present Application, this procedure shall be referred to as "carburisation"; see PCT/EP03/01323). This processing step results in modified chemical and mechanical properties.

Instead of a layer of a metal oxide having a high index of refraction materials, such as diamond-like carbon and amorphous carbon, can be deposited by plasma-assisted vacuum methods (using vibrating conveyors, rotating drum coaters, oscillatory drum coaters, and free-fall chambers) as described above.

In a further preferred embodiment, the pigment comprises in this order:
(a3) a silicon/silicon oxide layer obtainable by heating a $SiO_{1.00-1.8}$ layer in an oxygen-free atmosphere at a temperature above 400° C.,
(b3) a silicon/silicon oxide layer obtainable by heating a $SiO_{0.07-0.99}$ layer in an oxygen-free atmosphere at a temperature above 400° C., and
(c3) a silicon/silicon oxide layer obtainable by heating a $SiO_{1.00-1.8}$ layer in an oxygen-free atmosphere at a temperature above 400° C. and optionally further layers.

The pigments comprising layers (a3), (b3) and (c3) are prepared by a process comprising the steps:
a) vapour-deposition of a separating agent onto a movable carrier to produce a separating agent layer,
b1) vapour-deposition of a $SiO_y$ layer onto the separating agent layer, wherein $1.0 \leq y \leq 1.8$,
b2) vapour-deposition of a $SiO_y$ layer, wherein $0.70 \leq y \leq 0.99$, onto the layer obtained in step (b1),
b3) vapour-deposition of a $SiO_y$, wherein $1.0 \leq y \leq 1.8$, layer onto the metal layer obtained in step (b2),
c) dissolution of the separating agent layer in a solvent,
d) separation of the $SiO_4/Al/SiO_y$ particles from the solvent, and
e) heating the $SiO_{0.70-0.99}/SiO_{1.0-1.8}/SiO_{0.70-0.99}$ particles in an oxygen-free atmosphere to a temperature above 400° C.

The $SiO_{1.00-1.8}$ layer in step b1) and b3) is formed preferably from silicon monoxide vapour produced in the vaporiser by reaction of a mixture of Si and $SiO_2$ at temperatures of more than 1300° C.

The $SiO_{0.70-0.99}$ layer in step b2) is formed preferably by evaporating silicon monoxide containing silicon in an amount up to 20% by weight at temperatures of more than 1300° C.

If step (b3) is omitted, unsymmetrical pigments comprising layers (a3) and (b3) are obtained.

It is possible, for example, for the weathering resistance to be increased by means of an additional protective layer, from 2 to 250 nm thick (preferably from 10 to 100 nm thick), of an inorganic dielectric having a refractive index $\leq 1.6$ (such as $SiO_2$, $SiO(OH)_2$ etc.). Such a layer can be formed, for example, by oxidative heat treatment of the basis pigment.

In a preferred embodiment, the pigment comprises a further layer of a dielectric material having a 'high' refractive index, that is to say a refractive index greater than about 1.65, which is applied to the entire surface of the silicon/silicon oxide/reflective material/silicon/silicon oxide substrate (see above). The dielectric material is preferably a metal oxide, it being possible for the metal oxide to be a single oxide or a mixture of oxides, with or without absorbing properties, for example $CeO_2$, $TiO_2$, $ZrO_2$, $Fe_2O_3$, $Fe_3O_4$, $Cr_2O_3$ or $ZnO$, with $CeO_2$, $TiO_2$, and $ZrO_2$ being especially preferred.

The thickness of layer (b2) is generally 50 to 400 nm, especially 100 to 300 nm.

The thickness of layers (a3) and (c3) is generally 50 to 200 nm, especially 50 to 100 nm.

In addition, after heat-treatment in an oxygen-free atmosphere, the flakes can be subjected to oxidative heat treatment in air or some other oxygen-containing gas at a temperature of more than 200° C., preferably more than 400° C. and especially from 500 to 1000° C.

If, under industrial vacuums of a few $10^{-2}$ Pa, Si is vaporised (instead of $Si/SiO_2$ or SiO/Si) silicon oxides can be obtained which have an oxygen content of less than 0.70, that is to say $SiO_x$ wherein $0.03 \leq x \leq 0.69$, especially $0.05 \leq x \leq 0.50$, very especially $0.10 \leq x \leq 0.30$ (PCT/EP03/02196).

Accordingly, in a further preferred embodiment, the pigment comprises in this order:
(a4) a silicon/silicon oxide layer obtainable by heating a $SiO_{0.03-0.69}$ layer in an oxygen-free atmosphere at a temperature above 400° C.,
(b4) a silicon/silicon oxide layer obtainable by heating a $SiO_{1.00-1.8}$ layer in an oxygen-free atmosphere at a temperature above 400° C., and
(c4) a silicon/silicon oxide layer obtainable by heating a $SiO_{0.03-0.69}$ layer in an oxygen-free atmosphere at a temperature above 400° C., and optionally further layers, or the pigment comprises in this order:
(a5) a silicon/silicon oxide layer obtainable by heating a $SiO_{0.03-0.69}$ layer in an oxygen-free atmosphere at a temperature above 400° C.,
(b5) a silicon/silicon oxide layer obtainable by heating a $SiO_{0.70-0.99}$ layer in an oxygen-free atmosphere at a temperature above 400° C., and
(c5) a silicon/silicon oxide layer obtainable by heating a $SiO_{0.03-0.69}$ layer in an oxygen-free atmosphere at a temperature above 400° C., and optionally further layers.

Heating in the presence of oxygen at from 150 to 500° C., preferably from 175 to 300° C., unexpectedly results in a very thin, e.g. approximately 20 nm thick, superficial silicon dioxide layer, which represents a very convenient method of producing structures having the layer sequence $SiO_2/(a4)/(b4)/(c4)/SiO_2$.

In a further preferred embodiment, the pigment comprises in this order:
(a6) a silicon/silicon oxide layer obtainable by heating a $SiO_{0.70-0.99}$ layer in an oxygen-free atmosphere at a temperature above 400° C.,
(b6) a silicon/silicon oxide layer obtainable by heating a $SiO_{0.03-0.69}$ layer in an oxygen-free atmosphere at a temperature above 400° C., and
(c6) a silicon/silicon oxide layer obtainable by heating a $SiO_{0.70-0.99}$ layer in an oxygen-free atmosphere at a temperature above 400° C. and optionally further layers, or
(a7) a silicon/silicon oxide layer obtainable by heating a $SiO_{1.00-1.80}$ layer in an oxygen-free atmosphere at a temperature above 400° C.,
(b7) a silicon/silicon oxide layer obtainable by heating a $SiO_{0.03-0.69}$ layer in an oxygen-free atmosphere at a temperature above 400° C., and
(c7) a silicon/silicon oxide layer obtainable by heating a $SiO_{1.00-1.80}$ layer in an oxygen-free atmosphere at a temperature above 400° C. and optionally further layers.

It is furthermore possible to convert plane-parallel structures of silicon/silicon oxide as described above, starting from their surface, partially to silicon carbide (SiC) (in the context of the present Application, this procedure shall be referred to as "carburisation"; see PCT/EP03/01323). This processing step results in modified chemical and mechanical properties.

Instead of a layer of a metal oxide having a high index of refraction materials, such as diamond-like carbon and amorphous carbon, can be deposited by plasma-assisted vacuum methods (using vibrating conveyors, rotating drum coaters, oscillatory drum coaters, and free-fall chambers) as described above.

In certain embodiments, for example, pigments may be chosen from the structures (X=silicon/silicon oxide layer, obtainable by heating plane-parallel structures of $SiO_y$ in an oxygen-free atmosphere at a temperature above 400° C., wherein $0.70 \leq y \leq 1.8$): X/Al/X, C/X/Al/X/C, X/C/X/C/X, C/X/C/X/C, Al/X/Al/X/Al; Cr/X/Al/X/Cr; $MoS_2$/X/Al/X/$MoS_2$; $Fe_2O_3$/X/Al/X/$Fe_2O_3$; $MoS_2$/X/mica-oxide/X/$MoS_2$; and $Fe_2O_3$/X/mica-oxide/X/$Fe_2O_3$.

Various forms of carbon (C) can be utilized in the present invention, including but not limited to, graphitic, carbonaceous, and amorphous carbon; vitreous carbon; diamond-like carbon; amorphous hydrogenated carbon such as amorphous hydrogenated diamond-like carbon; carbon compounds; various combinations thereof, and the like. Other forms of carbon with different optical properties resulting from the method of deposition can also be utilized, such as arc evaporated carbon, ion assisted carbon I, and ion assisted carbon II.

The pigments according to the invention can be used for all customary purposes, for example for colouring polymers in the mass, surface coatings (including effect finishes, including those for the automotive sector) and printing inks, and also, for example, for applications in cosmetics. Such applications are known from reference works, for example "Industrielle Organische Pigmente" (W. Herbst and K. Hunger, VCH Verlagsgesellschaft mbH, Weinheim/New York, 2nd, completely revised edition, 1995).

When the pigments according to the invention are interference pigments (effect pigments), they are goniochromatic and result in brilliant, highly saturated (lustrous) colours. They are accordingly very especially suitable for combination with conventional, transparent pigments, for example organic pigments such as, for example, diketopyrrolopyrroles, quinacridones, dioxazines, perylenes, isoindolinones etc., it being possible for the transparent pigment to have a similar colour to the effect pigment. Especially interesting combination effects are obtained, however, in analogy to, for example, EP 388 932, or EP 402 943, when the colour of the transparent pigment and that of the effect pigment are complementary.

The pigments according to the invention can be used with excellent results for pigmenting high molecular weight organic material.

The high molecular weight organic material for the pigmenting of which the pigments or pigment compositions according to the invention may be used may be of natural or synthetic origin. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

From the series of the polyaddition resins and polycondensation resins there may be mentioned, for example, condensation products of formaldehyde with phenols, so-called phenoplasts, and condensation products of formaldehyde with urea, thiourea or melamine, so-called aminoplasts, and the polyesters used as surface-coating resins, either saturated, such as alkyd resins, or unsaturated, such as maleate resins; also linear polyesters and polyamides, polyurethanes or silicones.

The said high molecular weight compounds may be present singly or in mixtures, in the form of plastic masses or melts. They may also be present in the form of their monomers or in the polymerised state in dissolved form as film-formers or binders for surface coatings or printing inks, such as, for example, boiled linseed oil, nitrocellulose, alkyd resins, melamine resins and urea-formaldehyde resins or acrylic resins.

Depending on the intended purpose, it has proved advantageous to use the pigments or pigment compositions according to the invention as toners or in the form of preparations.

Depending on the conditioning method or intended application, it may be advantageous to add certain amounts of texture-improving agents to the pigment before or after the conditioning process, provided that this has no adverse effect on use of the effect pigments for colouring high molecular weight organic materials, especially polyethylene. Suitable agents are, especially, fatty acids containing at least 18 carbon atoms, for example stearic or behenic acid, or amides or metal salts thereof, especially magnesium salts, and also plasticisers, waxes, resin acids, such as abietic acid, rosin soap, alkylphenols or aliphatic alcohols, such as stearyl alcohol, or aliphatic 1,2-dihydroxy compounds containing from 8 to 22 carbon atoms, such as 1,2-dodecanediol, and also modified colophonium maleate resins or fumaric acid colophonium resins. The texture-improving agents are added in amounts of preferably from 0.1 to 30% by weight, especially from 2 to 15% by weight, based on the end product.

The pigments according to the invention can be added in any tinctorially effective amount to the high molecular weight organic material being pigmented. A pigmented substance composition comprising a high molecular weight organic material and from 0.01 to 80% by weight, preferably from 0.1 to 30% by weight, based on the high molecular weight organic material, of an pigment according to the invention is advantageous. Concentrations of from 1 to 20% by weight, especially of about 10% by weight, can often be used in practice.

High concentrations, for example those above 30% by weight, are usually in the form of concentrates ("masterbatches") which can be used as colorants for producing pigmented materials having a relatively low pigment content, the pigments according to the invention having an extraordinarily low viscosity in customary formulations so that they can still be processed well.

For the purpose of pigmenting organic materials, the pigments according to the invention may be used singly. It is, however, also possible, in order to achieve different hues or colour effects, to add any desired amounts of other colour-imparting constituents, such as white, coloured, black or effect pigments, to the high molecular weight organic substances in addition to the effect pigments according to the invention. When coloured pigments are used in admixture with the effect pigments according to the invention, the total amount is preferably from 0.1 to 10% by weight, based on the high molecular weight organic material. Especially high goniochromicity is provided by the preferred combination of an effect pigment according to the invention with a coloured pigment of another colour, especially of a complementary colour, with colorations made using the effect pigment and colorations made using the coloured pigment having, at a measurement angle of 10°, a difference in hue ($\Delta H^*$) of from 20 to 340, especially from 150 to 210.

Preferably, the effect pigments according to the invention are combined with transparent coloured pigments, it being possible for the transparent coloured pigments to be present either in the same medium as the effect pigments according to the invention or in a neighbouring medium. An example of an arrangement in which the effect pigment and the coloured pigment are advantageously present in neighbouring media is a multi-layer effect surface coating.

The pigmenting of high molecular weight organic substances with the pigments according to the invention is carried out, for example, by admixing such a pigment, where appropriate in the form of a masterbatch, with the substrates using roll mills or mixing or grinding apparatuses. The pigmented material is then brought into the desired final form using methods known per se, such as calendering, compression moulding, extrusion, coating, pouring or injection moulding. Any additives customary in the plastics industry, such as plasticisers, fillers or stabilisers, can be added to the polymer, in customary amounts, before or after incorporation of the pigment. In particular, in order to produce non-rigid shaped articles or to reduce their brittleness, it is desirable to add plasticisers, for example esters of phosphoric acid, phthalic acid or sebacic acid, to the high molecular weight compounds prior to shaping.

For pigmenting surface coatings and printing inks, the high molecular weight organic materials and the pigments according to the invention, where appropriate together with customary additives such as, for example, fillers, other pigments, siccatives or plasticisers, are finely dispersed or dissolved in the same organic solvent or solvent mixture, it being possible for the individual components to be dissolved or dispersed separately or for a number of components to be dissolved or dispersed together, and only thereafter for all the components to be brought together.

Dispersing an pigment according to the invention in the high molecular weight organic material being pigmented, and processing a pigment composition according to the invention, are preferably carried out subject to conditions under which only relatively weak shear forces occur so that the effect pigment is not broken up into smaller portions.

The colorations obtained, for example in plastics, surface coatings or printing inks, especially in surface coatings or printing inks, more especially in surface coatings, are distinguished by excellent properties, especially by extremely high saturation, outstanding fastness properties and high goniochromicity.

When the high molecular weight material being pigmented is a surface coating, it is especially a speciality surface coating, very especially an automotive finish.

The pigments according to the invention are also suitable for making-up the lips or the skin and for colouring the hair or the nails.

The invention accordingly relates also to a cosmetic preparation or formulation comprising from 0.0001 to 90% by weight of the silicon/silicon oxide flakes and/or of a pigment according to the invention and from 10 to 99.9999% of a cosmetically suitable carrier material, based on the total weight of the cosmetic preparation or formulation.

Such cosmetic preparations or formulations are, for example, lipsticks, blushers, foundations, nail varnishes and hair shampoos.

The pigments may be used singly or in the form of mixtures. It is, in addition, possible to use pigments according to the invention together with other pigments and/or colorants, for example in combinations as described hereinbefore or as known in cosmetic preparations.

The cosmetic preparations and formulations according to the invention preferably contain the pigment according to the invention in an amount from 0.005 to 50% by weight, based on the total weight of the preparation.

Suitable carrier materials for the cosmetic preparations and formulations according to the invention include the customary materials used in such compositions.

The cosmetic preparations and formulations according to the invention may be in the form of, for example, sticks, ointments, creams, emulsions, suspensions, dispersions, powders or solutions. They are, for example, lipsticks, mascara preparations, blushers, eye-shadows, foundations, eyeliners, powder or nail varnishes.

If the preparations are in the form of sticks, for example lipsticks, eye-shadows, blushers or foundations, the preparations consist for a considerable part of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecane-oxypolysiloxane and poly(dimethylsiloxy)-stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil, in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in the form of sticks may generally constitute up to 99.91% by weight of the total weight of the preparation.

The cosmetic preparations and formulations according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics, for example a natural or synthetic or partially synthetic di- or tri-glyceride, a mineral oil, a silicone oil, a wax, a fatty alcohol, a Guerbet alcohol or ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb sunburn-causing high-energy UV radiation in the range of approximately from 280 to 315 nm (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers); suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenyl-benzimidazolesulfonic acid and salts thereof, menthyl anthranilates, benzotriazole derivatives, and/or an inorganic micropigment selected from aluminium oxide- or silicon dioxide-coated $TiO_2$, zinc oxide or mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in "Pflegekosmetik" (W. Raab and U. Kindl, Gustav-Fischer-Verlag Stuttgart/New York, 1991) on page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protection against severe mechanical stresses on the skin;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives that can be applied dermally: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_1$, $B_2$, $B_6$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils that can be applied dermally: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

If the cosmetic preparations and formulations according to the invention are in the form of semi-solid products, that is to say in the form of ointments or creams, they may likewise be anhydrous or aqueous. Such preparations and formulations are, for example, mascaras, eyeliners, foundations, blushers, eye-shadows, or compositions for treating rings under the eyes.

If, on the other hand, such ointments or creams are aqueous, they are especially emulsions of the water-in-oil type or of the oil-in-water type that comprise, apart from the pigment, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, perfumes, antioxidants, preservatives, gel-forming agents, UV filters, colorants, pigments, pearlescent agents, non-coloured polymers as well as inorganic or organic fillers.

If the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

If the cosmetic preparations and formulations according to the invention are nail varnishes, they consist essentially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and formulations according to the invention may also be used for colouring the hair, in which case they are used in the form of shampoos, creams or gels that are composed of the base substances conventionally employed in the cosmetics industry and a pigment according to the invention.

The cosmetic preparations and formulations according to the invention are prepared in conventional manner, for example by mixing or stirring the components together, optionally with heating so that the mixtures melt.

The Examples that follow illustrate the invention without limiting the scope thereof. Unless otherwise indicated, percentages and parts are percentages and parts by weight, respectively.

EXAMPLES

Example 1

In a vacuum system which in its fundamental points is constructed analogously to the system described in U.S. Pat. No. 6,270,840, the following are vaporised, from vaporisers, in succession: sodium chloride (NaCl) as separating agent at about 900° C., and silicon monoxide (SiO) as reaction product of Si and $SiO_2$ at from 1350 to 1550° C. The layer thickness of NaCl is typically 30-50 nm, that of $SiO_y$ being, depending on the intended purpose of the end product, from 100 to 2000 nm, in the present case 215 to 385 nm. Vaporisation is carried out at about 0.02 Pa, amounting to about 11 g of NaCl and 72 g of SiO per minute. For subsequently detaching the layers by dissolution of the separating agent, the carrier on which vapour-deposition has taken place is sprayed at about 3000 Pa with deionised water and treated with mechanical assistance using scrapers and with ultrasound. The NaCl dissolves and the $SiO_y$ layer, which is insoluble, breaks up into flakes. The suspension is continuously removed from the dissolution chamber and, at atmospheric pressure, is concentrated by filtration and rinsed several times with deionised water in order to remove $Na^+$ and $Cl^-$ ions that are present. That is followed by the steps of milling, sieving and drying. All the particles have an average diameter smaller than 40 microns. A molybden crucible is then filled with these SiO flakes and set in a quartz tube. The quartz tube containing the Mo crucible with the SiO flakes is evacuated till the vacuum reaches about 13 Pa ($10^{-1}$ Torr). Then the tube is heated stepwise from room temperature to 900° C. The quartz tube is maintained at 900° C. during at least 1 hour. During the heating the color of the SiO flakes changes and the SiO powder becomes more and more opaque. After cooling to room temperature a full colored powder is obtained, which shows color changes in dependence of the observation angle, wherein the color depends on the thickness of the SiO flakes.

The reflection colour (CIE-L*C*h) of the silicon/silicon oxide flakes is determined at irradiation with standard illuminant $D_{65}$ under a 10° observation angle.

| Thickness of silicon/silicon oxide flakes [nm] | Color (in air) | L* | C* | H |
|---|---|---|---|---|
| 215 | blue | 27 | 27 | 270 |
| 245 | blue-green | 37 | 16 | 213 |
| 260 | green | 45 | 17 | 177 |
| 385 | violet | 24 | 34 | 307 |

Example 2

Example 1 is repeated, except that instead of a mixture of Si/$SiO_2$ a mixture of SiO containing 15% by weight Si is used. The obtained flakes have a ratio of oxygen to silicon of ca. 0.86, a thickness of about 120 nm and an average diameter smaller than 40 microns. A molybden crucible is then filled with these $SiO_{0.86}$ flakes and set in a quartz tube. The quartz tube containing the Mo crucible with the $SiO_{0.86}$ flakes is evacuated till the vacuum reaches about 13 Pa ($10^{-1}$ Torr). Then the tube is heated stepwise from room temperature to 900° C. The quartz tube is maintained at 900° C. during at least 1 hour. During the heating the color of the silicon oxide flakes changes and the silicon oxide powder becomes more and more opaque. After cooling to room temperature a full colored powder is obtained, which shows color changes in dependence of the observation angle (blue/violet →yellow/orange), wherein the color depends on the thickness of the silicon oxide flakes. The plane-parallel structures of $SiO_{0.86}$ show photoluminescence at 890-900 nm (excitation wavelength: ~300 nm).

Comparative Example 1

Example 1 is repeated, except that instead of a mixture of Si/$SiO_2$ SiO is used. The obtained yellow flakes have a ratio of oxygen to silicon of ca. 1.0 and a thickness of about 120 nm and do not show color changes in dependence of the observation angle.

Example 3

The silicon/silicon oxide flakes of Example 1 having a thickness of 215 nm are then coated with $TiO_2$ using conventional wet chemistry. The $TiO_2$ deposition is stopped when the $TiO_2$ thickness reaches about 30 nm. The obtained $TiO_2$ coated SiO flakes show a very bright yellow-green color in air.

The reflection colour (CIE-L*C*h) of the $TiO_2$ coated silicon/silicon oxide flakes is determined at irradiation with standard illuminant $D_{65}$ under a 10° observation angle.

| Thickness of $TiO_2$ coated SiO flakes | Color | L* | C* | H |
|---|---|---|---|---|
| 275 nm | yellow-green (in air) | 67 | 50 | 99 |
| 275 nm | yellow (in resin) | 46 | 44 | 86 |

Example 4

In a vacuum system which in its fundamental points is constructed analogously to the system described in U.S. Pat. No. 6,270,840, the following are vaporised, from vaporisers, in succession: sodium chloride (NaCl) as separating agent at about 900° C., Si (15% by weight)/SiO (85% by weight) at from 1350 to 1550° C., silicon monoxide (SiO) as reaction product of Si and $SiO_2$ at from 1350 to 1550° C., and Si (15% by weight)/SiO (85% by weight) at from 1350 to 1550° C. The layer thickness of NaCl is typically 30-50 nm, that of the (SiO/Si)(50-200 nm)/SiO(50-400 nm)/(SiO/Si)(50-200 nm) being 180 to 800 nm. Vaporisation is carried out at about 0.02 Pa. For subsequently detaching the layers by dissolution of the separating agent, the carrier on which vapour-deposition has taken place is sprayed at about 3000 Pa with deionised water and treated with mechanical assistance using scrapers and with ultrasound. The NaCl dissolves and the (SiO/Si)/SiO/(SiO/Si) layer, which is insoluble, breaks up into flakes. The suspension is continuously removed from the dissolution chamber and, at atmospheric pressure, is concentrated by filtration and rinsed several times with deionised water in order to remove $Na^+$ and $Cl^-$ ions that are present. That is followed by the steps of milling, sieving and drying. All the particles have an average diameter smaller than 40 microns. A molybden crucible is then filled with these (SiO/Si)/SiO/(SiO/Si) flakes and set in a quartz tube. The quartz tube containing the Mo crucible with the (SiO/Si)/SiO/(SiO/Si) flakes is evacuated till the vacuum reaches about 13 Pa ($10^{-1}$ Torr). Then the tube is heated stepwise from room temperature to 900° C. The quartz tube is maintained at 900° C. during at least 1 hour. After cooling to room temperature a full colored powder is obtained, which shows color changes in dependence of the observation angle, wherein a different concentration of Si in the $SiO_2$ matrix leads to different refractive indices and, hence, interference colors.

The reflection colour (CIE-L*C*h) of the (silicon/silicon oxide)/silicon oxide/(silicon/silicon oxide) flakes is determined at irradiation with standard illuminant $D_{65}$ under a 10° observation angle.

| Thickness of silicon/silicon oxide flakes [nm] | Color (in air) | L* | C* | H |
|---|---|---|---|---|
| (SiO/Si)(60 nm)/SiO(120 nm)/(SiO/Si)(60 nm)[1] | green/yellow | 51 | 38 | 152 |
| (SiO/Si)(60 nm)/SiO(120 nm)/(SiO/Si)(60 nm)[2] | ochre | 47 | 29 | 35 |
| (SiO/Si)(60 nm)/SiO(100 nm)/(SiO/Si)(60 nm)[1] | green | 50 | 33 | 182 |
| (SiO/Si)(60 nm)/SiO(100 nm)/(SiO/Si)(60 nm)[2] | Green-yellow | 46 | 42 | 140 |

[1]product before calcination at 900° C.; color flop: green/yellow → dark green.
[2]product after calcination at 900° C.; color flop: ochre → green/yellow.
[3]product before calcination at 900° C.; color flop: green → red/orange.

The invention claimed is:

1. Plane-parallel structures of silicon/silicon oxide, obtained by heating plane-parallel structures of $SiO_y$ in an oxygen-free atmosphere at a temperature above 400° C., wherein $0.70 \leq y \leq 1.8$, or plane-parallel structures of silicon/silicon oxide, obtained by heating plane-parallel structures of $SiO_x$ in an oxygen-free atmosphere at a temperature above 400° C., wherein $0.03 \leq x \leq 0.95$.

2. A cosmetic preparation or formulation comprising from 0.0001 to 90% by weight of the plane-parallel structures of silicon/silicon oxide according to claim 1 and from 10 to 99.9999% of a cosmetically suitable carrier material, based on the total weight of the cosmetic preparation or formulation.

3. Plane-parallel structures of silicon/silicon oxide according to claim 1, obtained by heating plane-parallel structures of $SiO_x$ in an oxygen-free atmosphere at a temperature above 400° C., wherein $0.05 \leq x \leq 0.50$.

4. Plane-parallel structures of silicon/silicon oxide according to claim 3, wherein $0.10 \leq x \leq 0.30$.

5. A plane-parallel pigment, comprising a silicon/silicon oxide layer, obtained by heating a $SiO_y$ layer in an oxygen-free atmosphere at a temperature above 400° C., wherein $0.70 \leq y \leq 1.8$, or a plane-parallel pigment, comprising a silicon/silicon oxide layer, obtained by heating plane-parallel structures of $SiO_x$ in an oxygen-free atmosphere at a temperature above 400° C., wherein $0.03 \leq x \leq 0.95$.

6. A pigment according to claim 5, wherein the silicon/silicon oxide layer, obtained by heating a $SiO_y$ layer in an oxygen-free atmosphere at a temperature above 400° C., forms the core of the pigment, wherein $0.70 \leq y \leq 1.8$.

7. A pigment according to claim 6, comprising a further layer of a dielectric material having a "high" refractive index.

8. A pigment according to claim 7, wherein the dielectric material is selected from the group consisting of silicon carbide (SiC), zinc sulfide (ZnS), zinc oxide (ZnO), zirconium oxide ($ZrO_2$), titanium dioxide ($TiO_2$), carbon, indium oxide ($In_2O_3$), indium tin oxide (ITO), tantalum pentoxide ($Ta_2O_5$), cerium oxide ($CeO_2$), yttrium oxide ($Y_2O_3$), europium oxide ($Eu_2O_3$), iron oxides such as iron(II)/iron (III) oxide ($Fe_3O_4$) and iron(III) oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide ($Nd_2O_3$), praseodymium oxide ($Pr_6O_{11}$), samarium oxide ($Sm_2O_3$), antimony trioxide ($Sb_2O_3$), silicon monoxides (SiO), selenium trioxide ($Se_2O_3$), tin oxide ($SnO_2$), tungsten trioxide ($WO_3$) and combinations thereof.

9. A pigment according to claim 8, wherein the dielectric material is selected from the group consisting of $TiO_2$, $ZrO_2$, $Fe_2O_3$, $Fe_3O_4$, $Cr_2O_3$, ZnO, a mixture of those oxides, an iron titanate, an iron oxide hydrate, a titanium suboxide and a mixture or mixed phase of those compounds.

10. A pigment according to claim 5 comprising in this order:
    (a) a silicon/silicon oxide layer obtained by heating a $SiO_y$ layer in an oxygen-free atmosphere at a temperature above 400° C.,
    (b) a reflective layer, and
    (c) a silicon/silicon oxide layer obtained by heating a $SiO_y$ layer in an oxygen-free atmosphere at a temperature above 400° C., wherein $0.70 \leq y \leq 1.8$.

11. A pigment according to claim 5, wherein the pigment comprises in this order:
    (a2) a silicon/silicon oxide layer obtained by heating a $SiO_{0.70-0.99}$ layer in an oxygen-free atmosphere at a temperature above 400° C.,
    (b2) a silicon/silicon oxide layer obtained by heating a $SiO_{1.00-1.80}$ layer in an oxygen-free atmosphere at a temperature above 400° C., and
    (c2) a silicon/silicon oxide layer obtained by heating a $SiO_{0.70-0.99}$ layer in an oxygen-free atmosphere at a temperature above 400° C., or
the pigment comprises in this order:
    (a3) a silicon/silicon oxide layer obtained by heating a $SiO_{1.00-1.80}$ layer in an oxygen-free atmosphere at a temperature above 400° C.,
    (b3) a silicon/silicon oxide layer obtained by heating a $SiO_{0.70-0.99}$ layer in an oxygen-free atmosphere at a temperature above 400° C., and
    (c3) a silicon/silicon oxide layer obtained by heating a $SiO_{1.00-1.80}$ layer in an oxygen-free atmosphere at a temperature above 400° C.

12. A pigment according to claim 5, wherein the pigment comprises in this order:
    (a4) a silicon/silicon oxide layer obtained by heating a $SiO_{0.03-0.69}$ layer in an oxygen-free atmosphere at a temperature above 400° C.,
    (b4) a silicon/silicon oxide layer obtained by heating a $SiO_{1.00-1.8}$ layer in an oxygen-free atmosphere at a temperature above 400° C., and
    (c4) a silicon/silicon oxide layer obtained by heating a $SiO_{0.03-0.69}$ layer in an oxygen-free atmosphere at a temperature above 400° C. and optionally further layers, or
the pigment comprises in this order:
    (a5) a silicon/silicon oxide layer obtained by heating a $SiO_{0.03-0.69}$ layer in an oxygen-free atmosphere at a temperature above 400° C.,
    (b5) a silicon/silicon oxide layer obtained by heating a $SiO_{0.70-0.99}$ layer in an oxygen-free atmosphere at a temperature above 400° C., and
    (c5) a silicon/silicon oxide layer obtained by heating a $SiO_{0.03-0.69}$ layer in an oxygen-free atmosphere at a temperature above 400° C. and optionally further layers, or
the pigment comprises in this order:
    (a6) a silicon/silicon oxide layer obtained by heating a $SiO_{0.70-0.99}$ layer in an oxygen-free atmosphere at a temperature above 400° C.,
    (b6) a silicon/silicon oxide layer obtained by heating a $SiO_{0.03-0.69}$ layer in an oxygen-free atmosphere at a temperature above 400° C., and
    (c6) a silicon/silicon oxide layer obtained by heating a $SiO_{0.70-0.99}$ layer in an oxygen-free atmosphere at a temperature above 400° C. and optionally further layers, or
the pigment comprises in this order:
    (a7) a silicon/silicon oxide layer obtained by heating a $SiO_{1.00-1.80}$ layer in an oxygen-free atmosphere at a temperature above 400° C.,
    (b7) a silicon/silicon oxide layer obtained by heating a $SiO_{0.03-0.69}$ layer in an oxygen-free atmosphere at a temperature above 400° C., and
    (c7) a silicon/silicon oxide layer obtained by heating a $SiO_{1.00-1.80}$ layer in an oxygen-free atmosphere at a temperature above 400° C. and optionally further layers.

13. A composition comprising a high molecular weight organic material and from 0.01 to 80% by weight, based on the high molecular weight organic material, of a pigment according to claim 5.

14. A method for imparting color characterized by the step of adding a pigment according to claim 5 to ink-jet printing materials, textiles, surface coatings, printing inks, plastics, cosmetics, glazes for ceramics and glass.

15. A plane-parallel pigment according to claim 5, comprising a silicon/silicon oxide layer, obtained by heating plane-parallel structures of $SiO_x$ in an oxygen-free atmosphere at a temperature above 400° C., wherein $0.05 \leq x \leq 0.50$.

16. A plane-parallel pigment according to claim 15, wherein $0.10 \leq x \leq 0.30$.

17. A composition according to claim 13 comprising from 0.1 to 30% by weight, based on the high molecular weight organic material, of said pigment.

18. A method of producing plane-parallel structures of silicon/silicon oxide, comprising the steps:
    a) vapour-deposition of a separating agent onto a movable carrier to produce a separating agent layer,
    b) vapour-deposition of an $SiO_y$ layer onto the separating agent layer,
    c) dissolution of the separating agent layer in a solvent,
    d) separation of the $SiO_y$ from the solvent, wherein $0.70 \leq y \leq 1.8$, and
    e) heating the $SiO_y$ in an oxygen-free atmosphere to a temperature above 400° C.

* * * * *